United States Patent
Neumeier

(10) Patent No.: US 7,802,950 B2
(45) Date of Patent: Sep. 28, 2010

(54) TOOL CLAMPING INSERT AND TOOL CLAMPING DEVICE

(75) Inventor: Manfred Neumeier, Esslingen (DE)

(73) Assignee: ESA Eppinger GmbH (DE)

( * ) Notice: Subject to any disclaimer, the term of this patent is extended or adjusted under 35 U.S.C. 154(b) by 1083 days.

(21) Appl. No.: 11/502,686

(22) Filed: Aug. 11, 2006

(65) Prior Publication Data

US 2007/0039148 A1    Feb. 22, 2007

(30) Foreign Application Priority Data

Aug. 16, 2005   (DE) .................. 10 2005 038 582

(51) Int. Cl.
*B23B 31/02*    (2006.01)
(52) U.S. Cl. .................. 409/234; 279/9.1; 279/103
(58) Field of Classification Search .................. 409/232, 409/234; 408/238–240; 279/9.1, 156, 103; 29/447
See application file for complete search history.

(56) References Cited

U.S. PATENT DOCUMENTS

| | | | | |
|---|---|---|---|---|
| 3,678,632 A | * | 7/1972 | Eversole et al. | 451/342 |
| 6,035,512 A | * | 3/2000 | Cook | 29/447 |
| 6,161,309 A | * | 12/2000 | Cook | 34/395 |
| 6,339,868 B1 | * | 1/2002 | Nagaya et al. | 29/447 |
| 6,726,223 B2 | * | 4/2004 | Haimer | 279/103 |
| 7,208,706 B2 | * | 4/2007 | Haimer et al. | 219/607 |
| 7,491,023 B2 | * | 2/2009 | Oesterle | 409/234 |

FOREIGN PATENT DOCUMENTS

| | | | |
|---|---|---|---|
| DE | 19638808 A1 | * | 3/1998 |
| DE | 10244759 A1 | * | 4/2004 |
| JP | 2000126961 A | * | 5/2000 |
| JP | 2001353634 A | * | 12/2001 |
| WO | WO 2004078391 A2 | * | 9/2004 |

* cited by examiner

*Primary Examiner*—Daniel W Howell
(74) *Attorney, Agent, or Firm*—Emch, Schaffer, Schaub & Porcello Co., LPA

(57) ABSTRACT

A tool clamping insert has a tool holder for receiving a tool shank. The tool holder hole is nominally smaller than the tool shank to be therein but upon heating of the insert expands to a size permitting insertion of the tool shank and, upon cooling, shrink fitting therein. The insert has an external clamping surface and is positioned in a clamping unit. The clamping surface and the tool holder hole are each configured with diameters, external and internal respectively, that change along the progression of their axial lengths.

16 Claims, 3 Drawing Sheets

TOOL CLAMPING INSERT AND TOOL CLAMPING DEVICE

CROSS REFERENCE TO RELATED APPLICATION

This application is based on German patent application no. 10 2005 038 582.6 filed Aug. 16, 2005.

BACKGROUND OF THE INVENTION

The invention relates to a tool clamping insert for stationary or rotating tools for use in a tool carrier comprising a tool clamping recess which demonstrates a narrowly tolerated internal clamping surface at least locally. In addition, the invention relates to a tool clamping device having such a tool clamping insert.

SUMMARY OF THE INVENTION

Clamping inserts are known, especially for applications in which ensuring a very precise clamping of a tool or drill bit or a boring bar is of concern, in which tools are clamped by their shank into a corresponding tool holder hole of a clamping insert body in shrink fit. As a rule, the tool holder hole is a straight cylindrical bore whose diameter when the tool shank has not been inserted is somewhat smaller than the diameter of the tool shank. To clamp the tool shank, the tool insert or a part thereof is inductively heated throughout using an induction coil so that the tool holder expends to a diameter that permits the tool shank to be inserted. In the subsequent cooling, the part of the clamping insert body surrounding the tool holder hole shrinks until the interior wall of the tool holder hole fits the shank of the tool and is clamped thereto in shrink fit. By appropriately dimensioning the diameter of the tool holder hole, it is thereby possible to achieve very large clamping forces which result in a correspondingly large torque being transferred from the tool clamping insert to the tool. This technique is known per se, a fact which also applies to the same extent to the achievable advantages.

Tool clamping inserts or tool clamping holders with shrink-fitted tools are used to a great extent in machine tools, e.g. CNC machining centers, in which the tool clamping inserts are inserted into corresponding recesses of tool carriers, such as work spindles or toolholders. The shrink-fit connection is located between the clamping insert and the tool shank, as a rule in an region axially in front of the tool-carrier/clamping-insert interface, so that a deformation, particularly expansion, attributable to the shrinkage of the tool shank, of the part of the clamping insert receiving the tool in shrink fit will not affect accuracy and stability in the region of the interface. Examples of clamping inserts of this type with tools inserted into the shrink fit, in which the shrink-fit connection is located in front of the interface of the tool-carrier/tool-clamping-insert, are described in U.S. Pat. Nos. 5,311,654; 6,371,705 B1 and 6,390,482 B1.

Moreover, there are also embodiments of tool clamping inserts having a tool clamped in shrink fit in which the shrink-fit connection between tool shank and clamping insert is located in the region of the tool-carrier/tool-clamping-insert interface. For a tool clamping insert that demonstrates a conical or cylindrical centering pivot to be inserted into a correspondingly shaped clamping-insert recess in the tool carrier, this means that the tool holder hole extends up into the centering pivot in the tool clamping insert and that the tool shank is clamped in the region of the centering pivot in shrink fit. One advantage of these types of tool clamping inserts is that they are particularly space-saving in the axial direction, making them particularly suitable for use in tool turrets in CNC turning centers or automatic lathes. Examples for this design of clamping inserts are described in U.S. Pat. No. 6,035,512 and DE 196 38 808 A1. But tool clamping inserts of this type have the basic problem that the tool shank shrink-fitted into the tool holder hole brings about dimensional changes in the tool-carrier/tool-clamping-insert interface during the shrink-fit process, these changes in particular appearing as uncontrolled enlargements or expansions of the diameter of the centering pivot of the tool clamping insert. The consequences of these changes are inaccuracies and stability losses in the region of the tool-carrier/tool-clamping-insert interface.

The object of the invention is therefore to prevent an impairment of the accuracy and stability of the tool-carrier/tool-clamping-insert interface in tool clamping inserts of the type discussed, without refinishing any parts.

The clamping insert comprises a clamping insert body upon which there is configured a centering pivot that enables the clamping insert to be inserted into a collet-chuck recess in the tool carrier thereby forming the tool-carrier/tool-clamping-insert interface. The centering pivot bears an external clamping surface with narrow tolerances for the nominal dimensions which, when the centering pivot has been inserted into the clamping-insert recess, fits an internal clamping surface of the clamping-insert recess accurate to size and can be clamped against this recess. The clamping insert body is configured with a tool holder hole which proceeds coaxial to the centering pivot from the tool entry side and extends into the centering pivot over at least a portion of the axial length of the centering pivot and is equipped to receive a tool shank that can be clamped in shrink fit.

Prior to the shrinkage of the tool shank into the tool holder hole of the clamping insert body, the tool holder hole and the external clamping surface of the centering pivot are configured with an internal and external diameter that changes along the course of their axial length.

The progressions of change, across the axial length of the external clamping surface, of the inside diameter of the tool holder hole and of the outside diameter of the external clamping surface of the centering pivot are dimensioned in such a manner that a dimensional change of the external clamping surface, which is brought about by the shrink-fit process and appears in the tool shrink-fitted into the tool holder hole, will bring their dimensions to the nominal dimensions within predefined tolerances. Even for a shrink-fitted tool, this again achieves the same tolerance range for the tool carrier on the tool-carrier/clamping insert interface as the tolerance range produced for a clamping insert whose external clamping surface on the centering pivot has the nominal dimensions to begin with, this being the case for example for a clamping insert having a clamping sleeve.

The external clamping surface of the centering pivot can be a conical surface which, in a preferred embodiment, can be dimensioned for insertion into a collet-chuck recess of a tool carrier. The concept according to the invention, however, can basically also be applied to clamping inserts that have a cylindrical or polygonal centering pivot for example.

In an embodiment that is meant for particularly high accuracy requirements in the region of the tool-carrier/tool-clamping-insert interface, the fitting arrangement is made in such a way that the tool clamping insert bears a first flat surface of narrow tolerances which runs perpendicular to the longitudinal axis of the centering pivot, is arranged in the region of the external clamping surface of the centering pivot, and extends radially outwards from the external clamping surface.

This first flat surface is advantageously configured on a side of a flange of the clamping insert body that faces the centering pivot. A tool clamping insert of this type, as described in DE 102 19 600 B4 for example, is characterized by a prestressed conical-surface and flat-surface fit on the tool carrier at the tool-carrier/tool-clamping-insert interface, this fit ensuring great stability and high accuracy. The features according to the invention maintain the full scope of these two properties, even when the tool clamping insert is configured in such a manner that it clamps a tool in shrink fit.

In the novel tool clamping insert, the tool holder hole is advantageously configured in such a manner that, for a tool shank that hasn't been shrink-fitted, it demonstrates an inside diameter in the region of the entry side of the clamping insert body that is essentially equal to or slightly smaller than the diameter of the shank of the tool to be shrink-fitted and larger than an inside diameter of the tool holder hole in the region of the external clamping surface of the clamping spigot. In practice this means that, on the insert side of the clamping insert body, the tool shank is not clamped or clamped with only small tension in the region of the opening of the tool holder hole and that the high tension needed to transmit torque occurs only deep in the tool holder hole, more on the end of the tool shank. This is in contrast to the relationships portrayed in U.S. Pat. No. 6,390,482 for a clamping insert in which the diameter of the tool holder hole on the tool entry side is substantially smaller than the bore diameter deep in the bore, i.e. in the region of the end of the tool shank.

The tool clamping insert can demonstrate a gripper groove on its centering pivot in the region of its external clamping surface, permitting location during the shrink-fit process and transport with a feeding device during tool change.

Finally the tool clamping insert can still demonstrate a second flat surface which is arranged on the face of the centering pivot facing away from the tool entry side, runs perpendicular to the longitudinal axis of the centering pivot and can be used as a bearing surface during the shrink-fit process, whereby in one advantageous embodiment, it runs at a precisely determined axial distance to the first flat surface that has already been mentioned.

The configuration of these two flat surfaces on the rear of the tool clamping insert displays its advantages in particular when used in a device for shrink-fitting a tool shank into a tool clamping insert of the type described above, as it is the subject matter of claim 14 according to further invention.

In this device, there is provided an induction-coil device, which is arranged in a guide so that it travels relative to a fixing device that receives the tool clamping insert, whereby the induction coil device demonstrates stop means for bringing it to a stop on a stop face, such as the abovementioned first flat surface of the tool clamping insert clamped in the fixing device. The fixing device demonstrates a supporting surface that is accurate to size and receives the second flat surface of the tool clamping insert. This ensures an accurate-to-size adjustment of the heat source in regard to the axial extents of the clamping insert during the shrink-fitting process, which ensures that dimensional variations on the clamping insert occurring during the shrink fit process will not result in deviations from the nominal dimensions, so that the perfect function and accuracy of the tool-carrier/tool-clamping-insert interface are ensured.

Further advantageous features of the tool clamping insert, the tool clamping device and the device for shrink fitting a tool shank in a tool clamping insert according to the invention are subject matter of the dependent claims.

Other objects and advantages of the present invention will become apparent to those skilled in the art upon a review of the following detailed description of the preferred embodiments and the accompanying drawings.

DETAILED DESCRIPTION OF THE PREFERRED EMBODIMENT(S)

Figure 1:
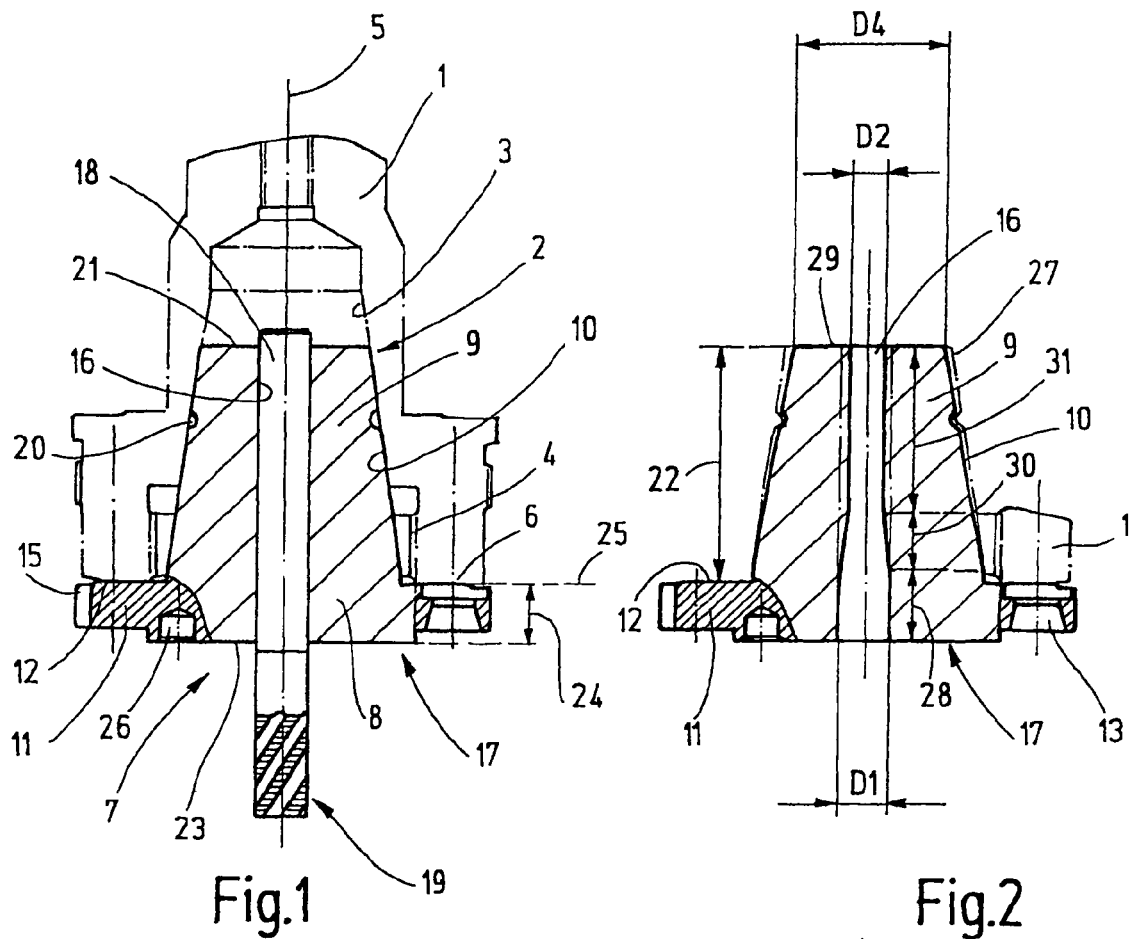
FIG. 1 a tool clamping device according to the invention provided with a tool clamping insert according to the invention, in axial section in a side view, illustrating the relationships for a tool shrink-fitted into the tool clamping insert, FIG. 2 the tool clamping insert of the device depicted in FIG. 1, in the state prior to the shrink-fitting of the tool, in axial section in a side view, illustrating the tool separated form the tool clamping insert, FIG. 3 the clamping device depicted in FIG. 1, in a modified embodiment and in a corresponding representation, FIG. 4 the device depicted in FIG. 3, cut along the line IV-IV in a top view, and FIG. 5 a tool shrink-fitting device according to the invention in axial section in a side view and in a schematic representation.

The tool clamping device for stationary and rotating tools illustrated in FIG. 1 demonstrates a tool carrier schematically indicated by 1, e.g. in the form of a work spindle only illustrated in cutout, which comprises a clamping-insert recess which, in the illustrated exemplary embodiment, is configured as collet-chuck recess 2 with a conical collet-chuck boring 3. Collet-chuck recesses and the associated collet chucks are standardized according to DIN 6499, April 2002, pages 1 to 8. A collet (not illustrated) can be clamped into the collet-chuck recess 2 by means of a collet nut, which is screwed into an inside thread 4, as is known per se. The collet-chuck recess 2 demonstrates an associated first flat surface 6, which is configured on the tool carrier 1 and runs perpendicular to the longitudinal center line 5 of the collet-chuck recess.

In the present case, the collet-chuck recess 2 serves for receiving a tool clamping insert 7, which demonstrates a clamping insert body 8 and a coaxial centering pivot 9, which is formed on the clamping insert body and bears a conical external clamping surface 10. The external clamping surface 10 is configured to correspond to an inside surface 3 of the collet-chuck recess 2, this inside surface 3 forming an internal clamping surface in such a manner that a close conical fit results between the two surfaces 3, 10 when the centering pivot 9 is inserted into the collet-chuck recess 2.

A ring flange 11, which bears a second flat surface 12 on its side facing the external clamping surface 10 of the centering pivot 9, is configured on the clamping insert body 8 adjacent to the centering pivot 9, the second flat surface 12 running perpendicular to the longitudinal center line 5 of the tool clamping insert 7 and the collet-chuck recess 2 and protruding radially over the external flat surface 6. When the centering pivot 9 has been inserted into the collet-chuck recess 2, the second flat surface 12 fits the first flat surface 6 of the tool carrier 1, just like the two conical clamping surfaces 3, 10 fit one another under elastic deformation so that there results a simultaneous conical fit and planar fit of the tool clamping insert 7 inserted into the collet-chuck recess 2, thereby ensuring high truth and stability on the interface of the tool carrier 1/tool clamping insert 7. When the tool clamping insert 7 is in its inserted state, it is axially clamped against the tool carrier 1 by clamping screws (not illustrated in FIG. 1), which traverse borings 13 arranged in the ring flange 11 at uniform angular intervals and are screwed into corresponding tap holes 14 (FIG. 4), which are configured in the region of the first flat surface 6 in the face of the tool carrier 1. Grooves 15 provided on the edge of the ring flange 11 serve as the socket for a hook wrench to turn the tool clamping insert 8 during assembly.

The clamping insert body 8 of the tool clamping insert 7 demonstrates a tool holder hole 16, which is coaxial to the longitudinal center line 5 and proceeds from a front tool entry side 17 of the clamping insert body 8 and extends through the latter and the centering pivot 9. The cylindrical shank 18 of a tool 19, in the present case a hob cutter, is clamped into the tool holder hole 16 in shrink fit.

Figure 2:
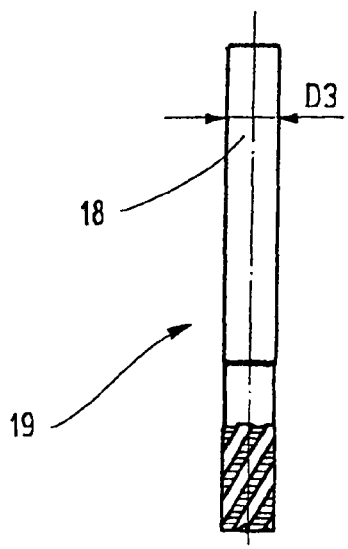

The centering pivot 9 is configured with a surrounding gripper groove 20 in the region of the external clamping surface 10. In addition, the face of the centering pivot 9 of the tool clamping insert opposite the front tool entry side 17 demonstrates a second finely-machined flat surface 21, which runs perpendicular to the longitudinal center line 5 and parallel to the second flat surface 12 at a precisely specified distance 22 (FIG. 2). The tool entry side 17 of the clamping insert body 8 is configured with a third flat surface 23, which likewise runs perpendicular to the longitudinal center line 5 and likewise is at a precisely defined axial distance 24 from the second flat surface 12, therefore demonstrating an interface 25 running between this second flat surface 12 and the first flat surface 6. A center hole 26, which proceeds from the third flat surface 23 and is coaxial to and radially displaced from the longitudinal center line 5 and whose significance will yet be described, is provided in the region of the third flat surface 23.

FIG. 2 represents the described tool clamping insert 7 in its state after production, i.e. before shrink-fitting of a tool shank 8 for the first time. The figure shows that the tool holder hole 16 is not configured completely cylindrical across its axial length, but has a change in diameter, which is greatly exaggerated in the figure for sake of explanation. The external clamping surface 10 on the centering pivot 9 also does not demonstrate the nominal shape 27, which is represented in FIG. 1 and predefined by the inside surface 3 of the collet-chuck recess 2, but is slightly modified relative to it, as again indicated in a greatly exaggerated manner for the sake of clarity.

Proceeding from the tool entry side 17, the tool holder hole 16 is essentially cylindrical, configured with a diameter D1, which is essentially equal to or slightly smaller than the shank diameter D3 of to tool shank 18, in a first region 28, which axially extends approximately to the edge of the conical external clamping surface 10. The tool holder hole 16 tapers in the axial direction following region 28 to a smaller diameter D2 in the region of the external clamping surface 10, the diameter D2 thus being smaller than the diameter D1 and smaller than the diameter D3, as is evident in a comparison with an extrapolation of the bore section 28, shown by the dashed line 29 in FIG. 2. In the illustrated embodiment, the transition from the bore section 28, which has the diameter D1, across a continuous transition region 30 into a bore section 31, which has the diameter D2, is continuous. In principle, however, embodiments are also conceivable in which the transition region 30 is replaced by a shoulder or the location hole 16 is configured with a plurality of steps. The axial length of the bore sections 28, 30, 31 and therefore the progression of the change in diameter across the longitudinal extension of the tool holder hole 16 depend on the operating conditions of the tool clamping insert and on its size and mass distribution. As a rule, these are determined empirically or by means of a plug gage.

The external dimensions of the centering pivot 9 in the region of its external clamping surface 10 are modified in such a manner that the diameter of clamping surface 10, proceeding from the nominal diameter in the region of the second flat surface 12, i.e. on the front edge of clamping surface 10, tapers toward the rear flat surface 27 to a value D4, which is smaller than the nominal diameter 27 of clamping surface 10 at this point, the nominal diameter being indicated by a dashed line in FIG. 2. In other words, the conical external clamping surface 10 is produced with a minus allowance such that it tapers more and more toward the nominal dimensions proceeding toward the rear flat surface 21.

Figure 5:
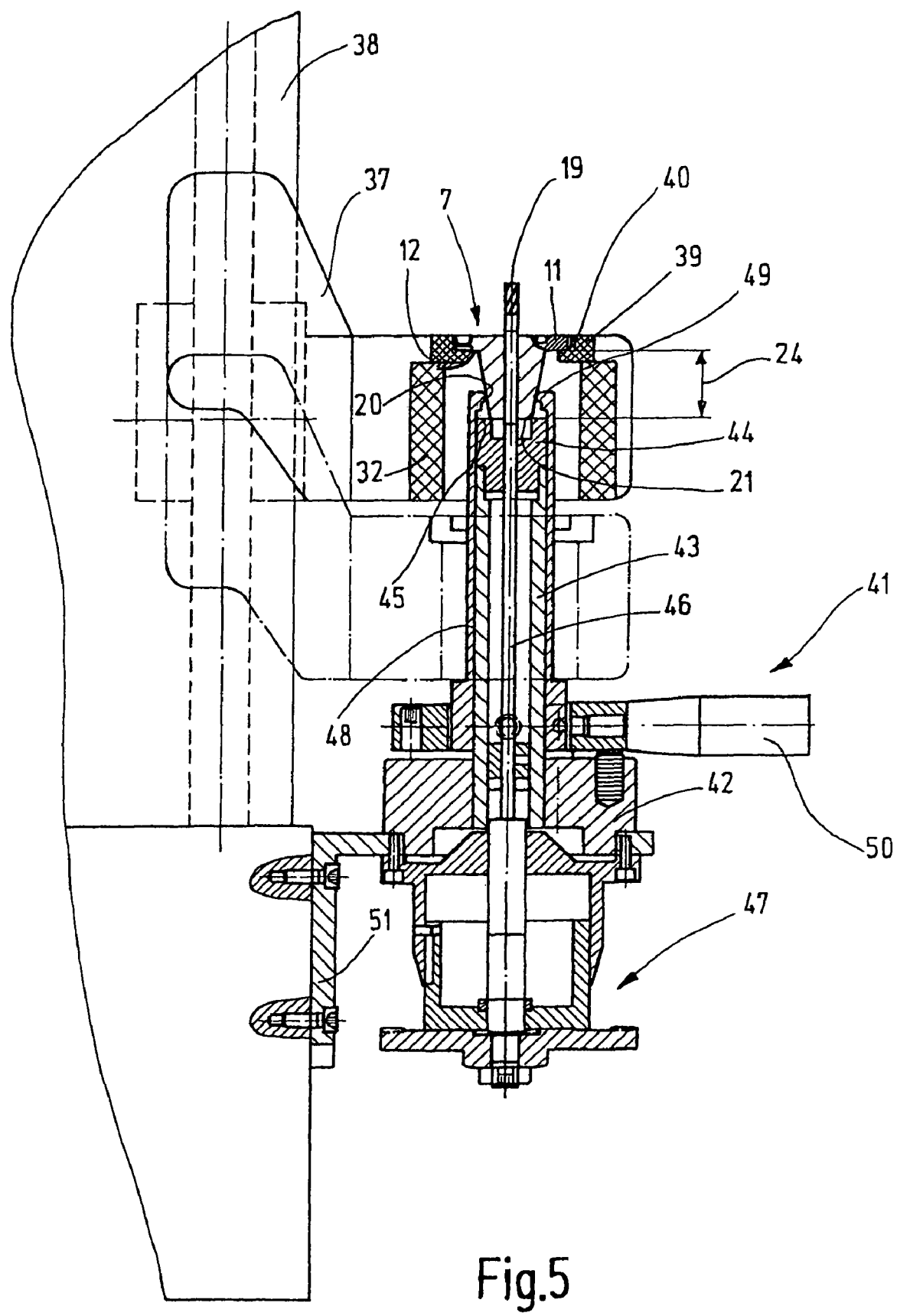

The tool clamping insert is heated inductively during the shrink-fitting of tool 19 into the tool holder hole 16. The heating occurs using an induction coil 32, which is illustrated in FIG. 5 in a shrink-fit device still to be explained. During the heating process, the induction coil 32 surrounds the centering pivot 9 of the tool clamping insert 7 at a radial distance, resulting in the generation of heat in the centering pivot 9. Since the centering pivot 9 demonstrates an increasing diameter from its rear third flat surface 21 to its front second flat surface 12 and it can approximately be assumed that convective heat transfer occurs within the centering pivot 9 in the direction toward the two flat surfaces 21, 12, the short heat input that takes place during the inductive heating heats the tool clamping insert to a lower temperature in the region of its ring flange 11 than that resulting to a growing extent in the direction toward the rear flat surface 21. Accordingly, the centering pivot 9 expands much more strongly in the bore region 31 than in the front bore region 28, where the expansion is very small or even negligible.

As soon as the rear bore section 31 has attained the diameter D3 during the heating, the tool shank 18 is pushed into the expanded tool holder hole 16 until it reaches the position depicted in FIG. 1, an action that occurs without trouble, because the highest temperature on the flat surface 21 is substantially higher than the highest temperature on the front flat surface 23.

After the tool shank 18 has been pushed in and the heat supply has been shut off, the tool clamping insert 7 cools down. The centering pivot 9 shrinks in the radial direction until the interior wall of the tool locating hole 16 makes a close fit to the tool shank 18 in the bore regions 30, 31 and the tool shank is locked in shrink fit under elastic prestress. The external clamping surface 10 of the centering pivot 9 also participates in this shrink-fitting process, returning from its expanded state back to the nominal dimensions indicated by 27 in FIG. 2 within narrow predefined tolerances.

For a shrink-fitted tool shank 18, the external clamping surface 10 thereby demonstrates precisely those nominal dimensions that are required for a stable, positionally accurate clamping with perfect conical and planar fit in the collet-chuck recess 2.

As already mentioned, it is possible to determine the reduction in size of the dimensions of the external clamping surface 10 after the shrink-fitting of the tool shank 18 or a corresponding plug gage as diameter D3 minus half of its diameter tolerance. In any case, it is possible to select the axial progression of the change in diameter of the tool holder hole 16 and the external clamping surface 10 in a manner so as to again achieve a tolerance range for the collet-chuck recess 2 of tool carrier 1 that ensures a conical and planar fit to the tool carrier by means of the elastic deformation of the flange-like fastening of tool clamping insert 7. During the heating, the centering pivot 9 heats to approximately 350° C. during a short time interval of a few seconds (approximately 2 to 10 s). At the same time, the inside diameter of the tool holder hole 16 in the axial center region of the centering pivot 9 expands by D1-D2, which is approximately 0.06 mm for a tool-shank diameter D3 (and therefore D1) of 22 mm.

By modifying the axial progression of tool holder hole 16 and the external dimensions of the external clamping surface 10 in correspondence with the course of thermal expansion during the heating, there is also achieved a perfect connection of the shrink-fitted tool shank 18 to the clamping insert body 8, the main clamping region of which transmits the torque and is basically located in the rear section 31 of tool holder hole 16, farther separated from the tool entry side 17 in the axial direction, it being possible to achieve a basically uniform clamping effect across the axial extent of the tool holder hole 16. In contrast, the clamping effect is small or non-existent in the front bore section 28, approximately along the length 24 in FIG. 1. This section preferably serves as a guide for the tool.

Figure 3:
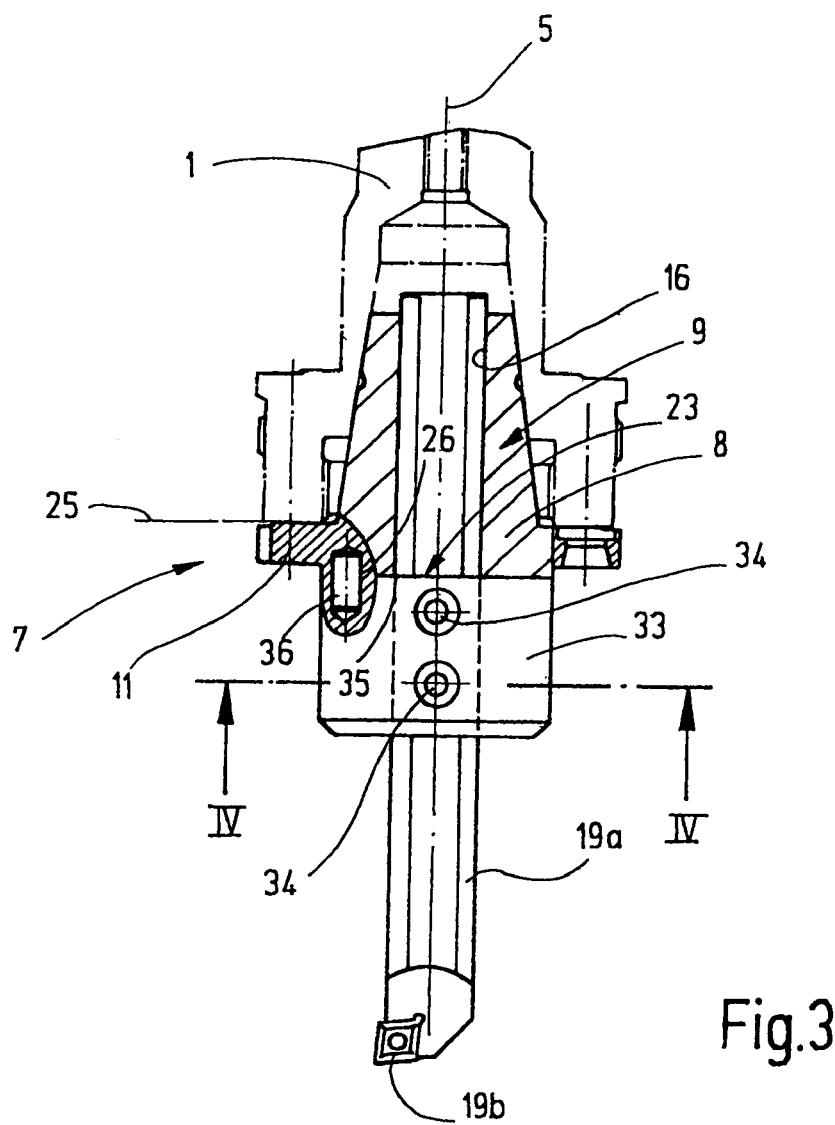
Figure 4:
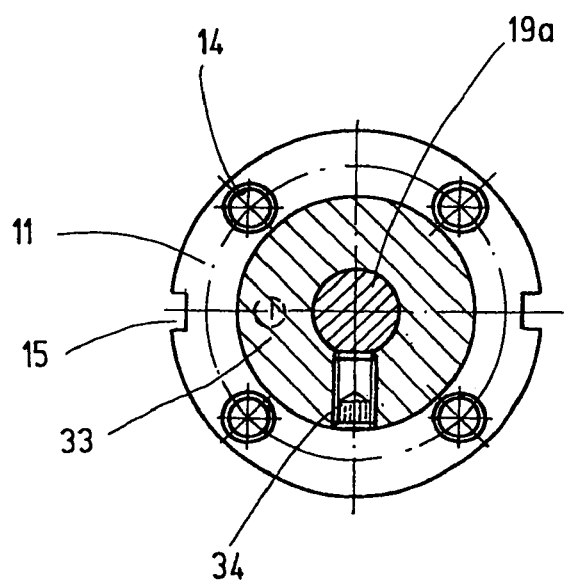

FIGS. 3 and 4 illustrate a modified embodiment of the clamping device depicted in FIG. 1. The same parts are provided with the same reference signs and will not be explained again.

In departure from the embodiment depicted in FIG. 1, a tool 19a in the form of a boring bar is now clamped into the tool holder hole 16 in shrink fit. A coupling ring 33 has been pushed onto the essentially cylindrical boring bar 19a prior to the shrink-fitting of the boring bar in the clamping insert 7. Radial pressure screws 34 fix the coupling ring 33, which has been pushed on with tight fit, to the boring bar 19a. The side of the coupling ring 33 facing the tool clamping insert 7 is provided with a flat surface 35, which runs perpendicular to the longitudinal center line 5 and rests on the front flat surface 23 of the clamping insert body 8 with perfect fit. A locking pin 36, which engages the locating bore 26 of the tool clamping insert 7 and is parallel to the axis, is inserted into the coupling ring 33 in the region of the flat surface 35. The locking pin 36 is pressed into a corresponding bore in the coupling ring 33 and its projecting part, together with its external diameter tolerance, is configured compensatingly smaller than the internal diameter of the locating bore 26. The fitting arrangement could also be made in reverse, i.e. the locking pin 36 could also be seated in the clamping insert body 9 or be replaced by another equally effective device. The coupling ring 33 ensures an exact axial and radial alignment of the boring bar 19a to the front flat surface 23 of the tool clamping insert 7 when the boring bar 19a is shrink-fitted into the tool holder hole 16 of the tool clamping insert 7, so that the position of the tool 19b, which is presented as indexable insert, is determined exactly in relation to interface 25.

Alternatively, the coupling ring 33 could also be configured in two parts so that it can again be removed after the shrink-fitting process.

The internal clamping surface 3 of the collet-chuck recess 2 does not incidentally have to extend across the entire axial length of the collet-chuck recess 2, i.e. up to the first flat surface 6. As illustrated in FIG. 1 for example, an essentially cylindrical region, within which the inside thread 4 is arranged and which does not contribute to the clamping of the centering pivot 9, is provided between the flat surface 6 and the conical internal surface 3.

The shrink-fitting of the tool 19 or 19a into the tool clamping insert 7 in the described way can, as already mentioned, be carried out with the shrink-fitting device illustrated in FIG. 5. The device illustrated in vertical operating position in FIG. 5 can be used for both shrink-fitting and removal of a tool. It demonstrates the already-mentioned induction coil 32, configured as toroidal coil, which can be connected to a current source that isn't illustrated. The induction coil 32 is mounted height-adjustable to a vertical longitudinal guide 38 by means of a fixing and guiding part 37 and its upper face fits an annular stop element 39, which bears a snap ring groove 40 that is open toward the top and contains a fitting surface.

A fixing device 41 for a tool clamping insert 7 is arranged coaxial to the induction coil 32, this fixing device 41 bearing a vertical guide tube 43, one side of which is anchored to a base part 42 and upon which there is placed a coaxial support piece 44 that demonstrates a level horizontal supporting surface 45, upon which the tool clamping insert 7 can be placed on its rear flat surface 21 accurate to size.

A coaxial rod 46, which is aligned with the tool holder hole 16 of the tool clamping insert 7 placed upon the supporting surface 45 and forms a bit stop for the tool 19 when it is inserted into the heated tool clamping insert 7, runs through the guide tube 43. This bit stop is axially adjustable. For this purpose, the rod 46 is connected to a scaled adjusting mechanism 47, which is mounted on the base part 42 and demonstrates a corresponding adjusting thread for the rod 46.

Collet-chuck-like gripping means, which engage the gripper groove 20 of the tool clamping insert 7 using claws 49 arranged on their ends and clamp it onto the location surface 45 in the precisely correct position, are mounted on the external side of the guide tube 43. An activation device, indicated by 50, serves to activate the gripping means 48. A holder 51, which also bears the vertical guide device 38, fastens the entire shrink-fit device to a frame part. The guide device may be completely or partially exchanged to adapt the fixing device to different tool clamping inserts.

In shrink-fitting a tool 19 into the tool clamping insert 7, the latter is placed on the supporting surface 45 and clamped into the correct position by the gripping means 48, which engage the gripper groove 20. The induction coil 32 is displaced upwards until its flat surface fits into its flat ring groove 40 on the flat surface 12 of the tool clamping insert 7. Since the axial distance 24 between the two flat surfaces 12 and 21 of the tool clamping insert 7 is precisely defined, the position of the induction coil 32 relative to the centering pivot 9 of the clamping insert 7 is precisely determined. This therefore also defines the temperature profile that appears within the tool clamping insert 7 during the short heating, so that the changes in the dimensions of the tool clamping insert and its tool holder hole are exactly reproduced during the shrink-fitting.

After the clamping insert 7 has been heated, the induction coil 32 can be lowered into the position indicated by dashed lines in FIG. 5, permitting free unobstructed removal and insertion of a clamping insert 7.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A tool clamping insert for stationary or rotating tools for use in a tool carrier having a clamping-insert receiving recess (2) with an internal clamping surface (3) encircling an axis and tapering inwardly toward said axis in a direction from a tool entry front side (17) toward a rear side, said insert comprising a clamping insert body (8) with a co-axial centering pivoting (9) provided thereon and adapted to be inserted into said clamping-insert receiving recess (2), said centering pivot (9) having an external clamping surface (10) with nominal dimensions of specified tolerances to engage said internal clamping surface in a close fit between said two surfaces when said centering pivot is received in said clamping-insert receiving recess, said clamping insert body further comprising a tool holder hole (16) which is coaxial to the centering pivot and extends from said front side into the centering pivot over at least a portion of the axial length of the centering pivot over at least a portion of the axial length of the centering pivot, said tool holder hole being configured to receive a tool shank (18) for clamping said tool shank in a shrink fit, wherein, in the absence of a tool shank shrink-fitted into the tool holder hole of the clamping insert body, said external clamping surface (10), at least in an area of the clamping pivot, has outer dimensions that are smaller than said nominal dimensions, and the external clamping surface (10) and said tool holder hole (16) are configured with external and internal diameters, respectively, that change along the progression of their axial length, the course of said change of said diameters across the axial length being dimensioned in such a manner that a dimensional deformation of the external clamping surface occurring upon the tool shank being shrink-fitted into the tool holder hole, will be compensated, thereby bringing the dimensions of the external surface of the centering pivot with said tool shank shrink-fitted into the tool holder hole, to said nominal dimensions (27), within said specified tolerances.

2. A tool clamping insert according to claim 1, characterized in that the external clamping surface (10) of the centering pivot (9) is a conical surface.

3. A tool clamping insert according to claim 2, characterized in that the conical surface is dimensioned for insertion into a collet-chuck recess (2) of a tool carrier.

4. A tool clamping insert according to claim 1, characterized in that it comprises a first flat surface (12) of narrow tolerances which is oriented perpendicular to the longitudinal axis (5) of the centering pivot, is arranged in the region of the external clamping surface (10), and extends radially outwards from the external clamping surface.

5. A tool clamping insert according to claim 4, characterized in that the first flat surface (12) is configured on a side of a flange (11) of the clamping insert body (8) that faces the centering pivot (9).

6. A tool clamping insert according to claim 1, characterized in that, in the absence of a tool shank shrink-fitted into the tool holder hole, the tool holder hole (16) in a region of the entry tool front side of the clamping insert body (8) has an inside diameter (D1) that is essentially equal to or smaller than the diameter (03) of the shank (18) of a tool shank to be shrink-fitted in said hole and larger than in inside diameter (02) of the tool holder hole (16) in a region of the external clamping surface of the centering pivot.

7. A tool clamping insert according to claim 6, characterized in that the inside diameter of the tool holder hole (16) is continuously varying across the axial length of the hole, at least locally.

8. A tool clamping insert according to claim 4, characterized in that it comprises at least one further flat surface (21) which is oriented perpendicular to the longitudinal axis (5) of the centering pivot (9) and is arranged on at least one of a face of the centering pivot (9) facing away from the tool entry front side (17), a face on the tool entry front side (17) of the clamping insert body (8) or of a part (11) connected thereto.

9. A tool clamping insert according to claim 1, characterized in that a gripper groove (20) is configured on the centering pivot (9) in the region of its external clamping surface (10).

10. A tool clamping device for a stationary or rotating tool (19) that is shrink-fitted into a tool clamping insert (7), comprising a tool clamping insert (7) and a tool clamping-insert receiving recess (2) on a tool carrier (1) in which said tool clamping insert (7) comprises a clamping insert body (8) upon which a centering pivot (9) is provided and which contains a tool holder hole (16) which is coaxial to the centering pivot and extends from a tool entry front side (17) of the clamping insert body and extends into the centering pivot over at least a portion of its axial length and into which the shank (18) of a tool (19) can be clamped in a shrink fit;

said tool carrier (1) having an internal clamping surface (3), disposed on the clamping-insert receiving recess (2) and said centering pivot (9) of the tool clamping insert (7) having an external clamping surface (10) shaped to correspond to the internal clamping surface, the two clamping surfaces (3, 10) closely fitting one another to mutually clamp one another when the centering pivot has been inserted into the clamping insert receiving recess, and wherein, in the absence of a tool shank shrink-fitted into the tool holder hole of the clamping insert body, said external clamping surface (10), at least in an area of the clamping pivot, has outer dimensions that are smaller than nominal dimensions, specified following said tool shank being shrink-fitted into said tool holder hole and the external clamping surface and said tool holder hole (16) are configured with external and internal diameters, respectively, that change along the progression of their axial length, the course of said change of said diameters across the axial length being dimensioned in such a manner that a dimensional deformation of the external clamping surface occurring upon the tool shank being shrink-fitted into the tool holder hole, will be compensated, thereby bringing the dimensions of the external surface of the centering pivot with said tool shank shrunk into the tool holder hole, to said nominal dimensions (27), within specified tolerances.

11. A tool clamping device according to claim 10, characterized in that the internal and external clamping surfaces (3, 10) are each conical surfaces.

12. A tool clamping device according to claim 11, characterized in that clamping-insert receiving recess is configured as a collet-chuck recess (2).

13. A tool clamping device according to claim 12, characterized in that the tool clamping insert (7) has a first flat surface (12), which is coaxial to the centering pivot (9) and is associated with and extends radially outwards from the external clamping surface (10) of the centering pivot, and that the clamping-insert receiving recess (2) has a second flat surface (6) associated therewith which is coaxial to its longitudinal axis (5) and that the internal and the external clamping surfaces (3, 10) mutually clamp one another under elastic deformation when the centering pivot (9) has been inserted into the tool clamping-insert receiving recess (2) and the first and second flat surfaces (12, 6) are pressed against one another with a planar fit.

14. A tool clamping device according to claim 10, characterized in that, in the absence of a shank (18) shrink-fitted into the tool holder hole, the tool holder hole (16) of the tool clamping insert (7) has, in the region of its opening on the tool entry front side (17) of the clamping insert body (8), a diameter (D1) which is essentially equal to or slightly smaller than the diameter (02) of the tool holder hole (16) located in the region of the external clamping surface.

15. A tool clamping device according to claim 13, characterized in that, a coupling ring (33), which is rotatably fixed against the flat surface of the tool clamping insert (7), is firmly positioned on the tool (19*a*).

16. Tool clamping device according to claim 10, characterized in that, in the axial direction, the internal clamping surface (3) of the clamping-insert receiving recess (2) extends over only a portion of the axial length of the clamping-insert receiving recess.

\* \* \* \* \*